(12) United States Patent
Tonogai et al.

(10) Patent No.: US 7,394,646 B2
(45) Date of Patent: Jul. 1, 2008

(54) LAMINATED CERAMIC ELECTRONIC COMPONENT

(75) Inventors: Toru Tonogai, Tokyo (JP); Tatsuya Kojima, Tokyo (JP); Akinori Iwasaki, Minamiashigara (JP); Raitaro Masaoka, Tokyo (JP); Shogo Murosawa, Tokyo (JP); Akira Yamaguchi, Tokyo (JP); Kyotaro Abe, Tokyo (JP); Tsukasa Sato, Tokyo (JP)

(73) Assignee: TDK Corporation, Tokyo (JP)

( * ) Notice: Subject to any disclaimer, the term of this patent is extended or adjusted under 35 U.S.C. 154(b) by 166 days.

(21) Appl. No.: 11/374,041

(22) Filed: Mar. 14, 2006

(65) Prior Publication Data
US 2006/0215350 A1    Sep. 28, 2006

(30) Foreign Application Priority Data
Mar. 28, 2005    (JP)    ............... 2005-093030

(51) Int. Cl.
*H01G 4/06*    (2006.01)
*H01G 4/005*    (2006.01)

(52) U.S. Cl. ...................................... 361/311; 361/303

(58) Field of Classification Search ......... 361/303–305, 361/311–312, 306.1, 306.2, 306.3, 309, 320, 361/323
See application file for complete search history.

(56) References Cited

U.S. PATENT DOCUMENTS

| | | | | |
|---|---|---|---|---|
| 6,069,786 A | * | 5/2000 | Horie et al. ................ | 361/303 |
| 6,587,327 B1 | * | 7/2003 | Devoe et al. ............. | 361/306.3 |
| 7,092,236 B2 | * | 8/2006 | Lee et al. ................... | 361/311 |
| 2004/0257748 A1 | * | 12/2004 | Ritter et al. .............. | 361/306.3 |
| 2006/0039097 A1 | * | 2/2006 | Satou ........................ | 361/303 |
| 2007/0121275 A1 | * | 5/2007 | Takashima et al. .......... | 361/311 |

FOREIGN PATENT DOCUMENTS

| JP | 01281717 A | * | 11/1989 |
|---|---|---|---|
| JP | 05190378 A | * | 7/1993 |
| JP | 05190379 A | * | 7/1993 |
| JP | 08-316086 A | | 11/1996 |
| JP | 10-012475 A | | 1/1998 |
| JP | 2003-309039 | | 10/2003 |

OTHER PUBLICATIONS

U.S. Appl. No. 11/406,352, filed Apr. 19, 2006, Kojima.
U.S. Appl. No. 11/346,288, filed Feb. 3, 2006, Kojima et al.

* cited by examiner

*Primary Examiner*—Eric Thomas
(74) *Attorney, Agent, or Firm*—Oblon, Spivak, McClelland, Maier & Neustadt, P.C.

(57) ABSTRACT

A laminated ceramic electronic component includes a ceramic substrate, an internal electrode, and a buffer layer. The ceramic substrate includes a protective layer and a functional layer. The protective layer is disposed on at least one side of the functional layer. The internal electrode is embedded in the functional layer. The buffer layer is embedded in the protective layer and has a different burning shrinkage from the ceramic substrate.

14 Claims, 10 Drawing Sheets

LAMINATED CERAMIC ELECTRONIC COMPONENT

BACKGROUND OF THE INVENTION

1. Field of the Invention

The present invention relates to a laminated ceramic electronic component.

2. Description of the Related Art

Electronic devices with laminated ceramic electronic components such as a laminated ceramic capacitor and a laminated ceramic substrate are becoming smaller in size with an attempt to achieve higher performance and greater functionality. In order to keep up with the technology trends, it is also required to improve characteristics and achieve downsizing of the laminated ceramic electronic components by further thinning, multi-layering, and greater density.

The laminated ceramic electronic components generally include a functional layer embedded with an internal electrode and protective layers disposed on both sides of the functional layer. Typically, since no internal electrode is embedded in the protective layer, the protective layer differs from the functional layer in burning shrinkage and thermal expansion coefficient. For instance, it is often the case that the protective layer of the laminated ceramic capacitor has a higher burning shrinkage and a lower thermal expansion coefficient than the functional layer.

The difference in burning shrinkage/thermal expansion coefficient between the functional layer and the protective layer produces a large stress along an interface between them during the process of manufacturing the laminate ceramic electronic components, which tends to cause separation, delamination and cracks. Particularly, there is a problem that cracks tend to be caused by heat treatment (or annealing) or burning with stress remaining therein.

Japanese Patent Application Publication No. 2003-309039 discloses a technology of preventing delamination and cracks by adjusting the binder content of the protective layer and the difference in burning shrinkage between the functional layer and the protective layer.

However, the technology disclosed in JP 2003-309039 has a problem of complicating the manufacturing process because of the necessity of a plurality of sheets with different binder contents.

In addition, since the stress and physical strain along the interface between the functional layer and the protective layer increase with thinning and multi-layering, the above-mentioned problems are becoming more prominent due to thinning, multi-layering, and greater density of recent laminated ceramic electronic components.

SUMMARY OF THE INVENTION

It is an object of the present invention to provide a laminated ceramic electronic component which is capable of inhibiting occurrence of separation, delamination and cracks.

It is another object of the present invention to provide a laminated ceramic electronic component which is excellent in electrical characteristics.

It is still another object of the present invention to provide a laminated ceramic electronic component which is capable of enhancing production yield.

It is still another object of the present invention to provide a laminated ceramic electronic component which is easy to manufacture.

To achieve at least one of the above objects, the present invention provides a laminated ceramic electronic component comprising a ceramic substrate, an internal electrode, and a buffer layer. The ceramic substrate includes a protective layer and a functional layer. The protective layer is disposed on at least one side of the functional layer. The internal electrode is embedded in the functional layer. The buffer layer is embedded in the protective layer and has a different burning shrinkage from the ceramic substrate.

In the above-described laminated ceramic electronic component of the present invention, since the internal electrode is embedded in the functional layer, the burning shrinkage of the functional layer is a resultant of the burning shrinkage of the internal electrode and the burning shrinkage of the ceramic substrate surrounding the internal electrode.

On the other hand, since the buffer layer is embedded in the protective layer, the burning shrinkage of the protective layer is a resultant of the burning shrinkage of the buffer layer and the burning shrinkage of the ceramic substrate surrounding the buffer layer.

In the present invention, the buffer layer has a different burning shrinkage from the ceramic substrate. For example, the burning shrinkage of the buffer layer may be determined so that the burning shrinkage of the functional layer approximately agrees with the burning shrinkage of the protective layer.

Making the burning shrinkage of the functional layer approximately agree with the burning shrinkage of the protective layer decreases stress along the interface between the functional layer and the protective layer, inhibiting the occurrence of separation, delamination and cracks along the interface, which has been a problem in the prior art. This inhibits the occurrence of separation, delamination and cracks, even when the electronic component is subjected to heat treatment (or annealing) or burning.

In addition, since the buffer layer is embedded in the protective layer covering the functional layer, even if separation, delamination or cracks occur in the vicinity of the surface of the laminated ceramic electronic component, the cracks and the like can be stopped by the buffer layer. This avoids the adverse effect on the internal electrode, resulting in excellent electrical characteristics. Moreover, production yield can be enhanced by preventing a defect that the internal electrode is exposed (namely, cap off problem).

Furthermore, the buffer layer embedded in the protective layer divides the protective layer into separate layers to substantially reduce the thickness of the protective layer. This improves the conformability of the protective layer, preventing the occurrence of separation, delamination and cracks.

Since the laminated ceramic electronic component of the present invention does not need a plurality of sheets with different binder contents, unlike JP 2003-309039, the manufacturing process becomes simple. For example, the laminated ceramic electronic component of the present invention can easily be manufactured when the ceramic substrate constituting the functional layer and the ceramic substrate constituting the protective layer have the same material composition and the internal electrode and the buffer layer have the same material composition.

In addition, since the burning shrinkage of the protective layer can easily be adjusted by the number, thickness and shape of the buffer layers, the laminated ceramic electronic component of the present invention can easily be manufactured with a high yield.

According to another aspect of the present invention, the buffer layer has a different thermal expansion coefficient from the ceramic substrate with focusing on the thermal expansion coefficient of the buffer layer instead of the burning shrinkage of the buffer layer. Also in this case, the same effects and advantages can be obtained.

As has been described hereinabove, the present invention has at least one of the following advantages:

(a) Providing a laminated ceramic electronic component which is capable of inhibiting occurrence of separation, delamination and cracks.

(b) Providing a laminated ceramic electronic component which is excellent in electrical characteristics.

(c) Providing a laminated ceramic electronic component which is capable of enhancing production yield.

(d) Providing a laminated ceramic electronic component which is easy to manufacture.

The present invention will be more fully understood from the detailed description given hereinbelow and the accompanying drawings which are given by way of illustration only, and thus are not to be considered as limiting the present invention.

DESCRIPTION OF THE PREFERRED EMBODIMENTS

Figure 1:
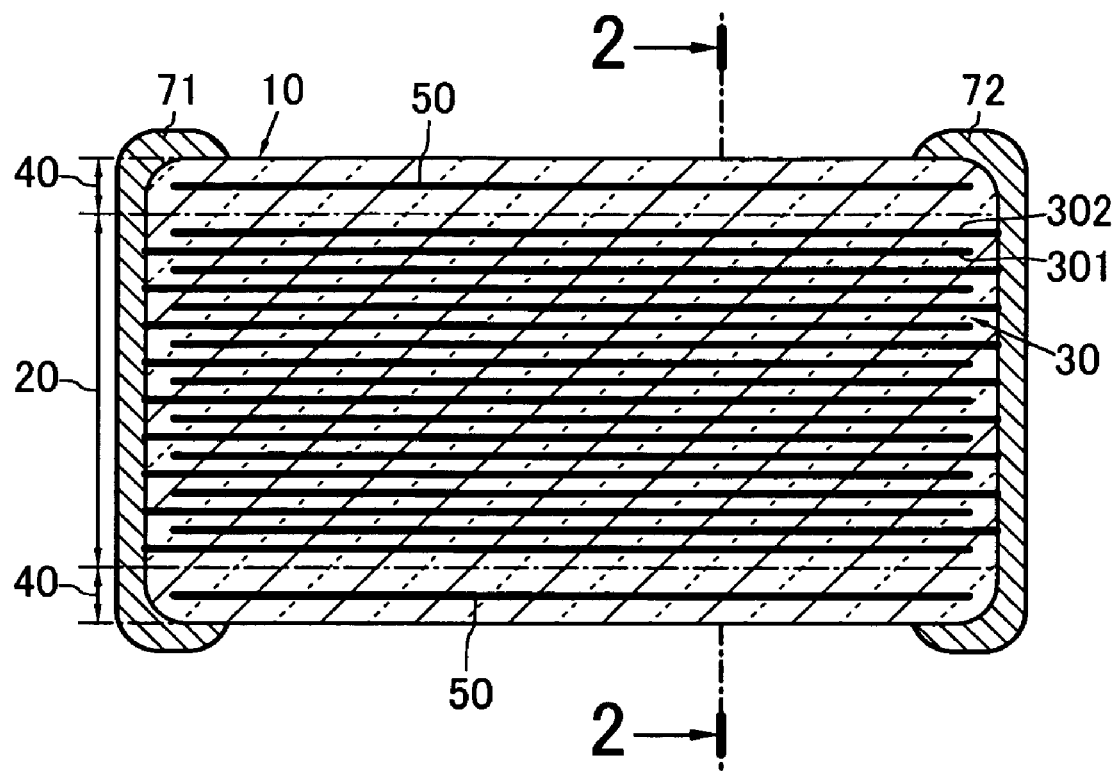
FIG. 1 is a front sectional view of a laminated ceramic electronic component according to one embodiment of the present invention.
Figure 2:
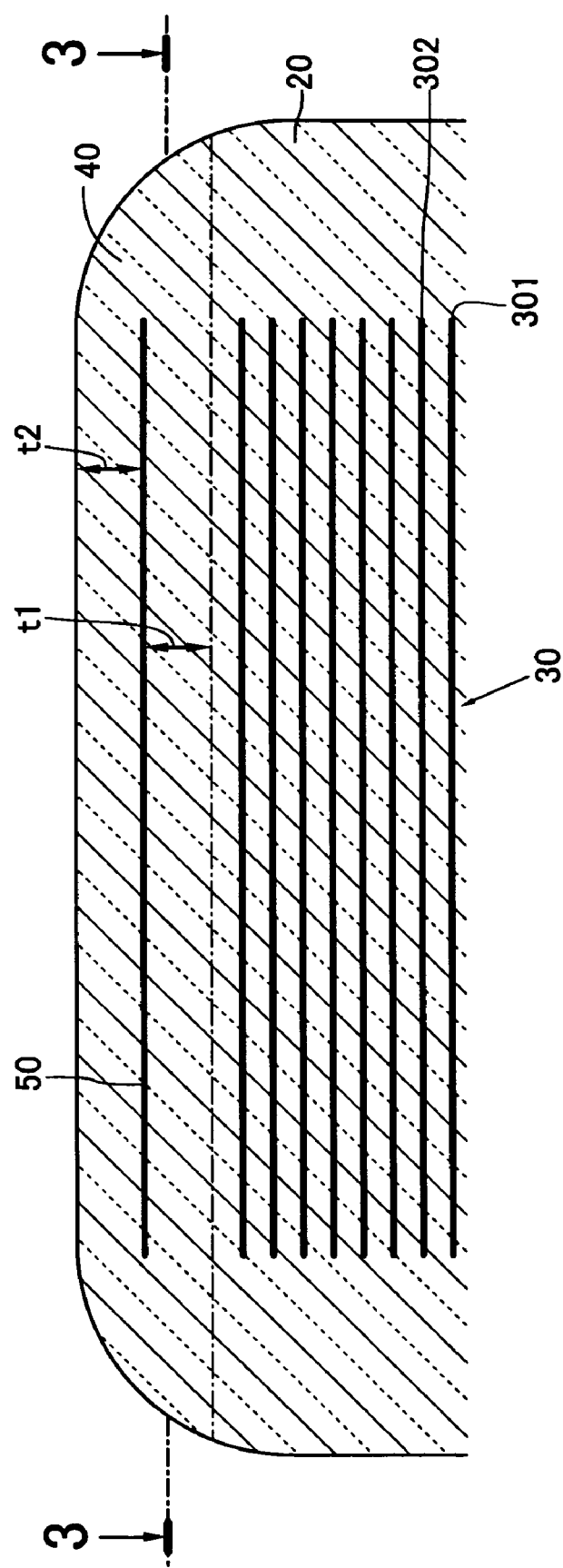
FIG. 2 is an enlarged sectional view taken along line 2-2 of FIG. 1.
Figure 3:
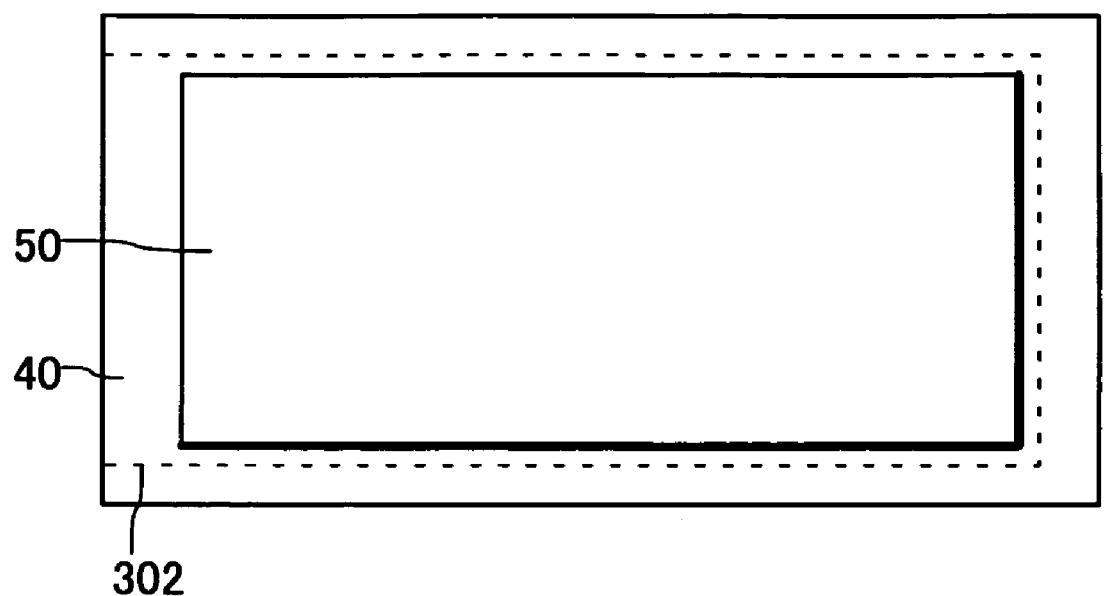
FIG. 3 is a sectional view taken along line 3-3 of FIG. 2.

Referring to FIGS. 1 to 3, a laminated ceramic electronic component includes a ceramic substrate 10, an internal electrode 30, and buffer layers 50. The ceramic substrate 10 includes a functional layer 20 and protective layers 40. The illustrated laminated ceramic electronic component may be adopted as a laminated ceramic capacitor, a laminated ceramic inductor, a multilayer ceramic substrate and the like.

The protective layer 40 is provided to protect the functional layer 20. In FIG. 1, both the top and bottom sides of the functional layer 20 are covered with the protective layers 40, but it is also possible to provide only one protective layer 40 on either of the top and bottom sides of the functional layer 20.

The ceramic substrate constituting the functional layer 20 and the ceramic substrate constituting the protective layer 40 may have the same composition or different compositions. For example, the functional layer 20 and the protective layer 40 may be made of a ceramic dielectric.

The interface between the functional layer 20 and the protective layer 40 is not required to be distinct. Of the ceramic substrate 10, as will be described hereinbelow, the portion embedded with the internal electrode 30 functions as the functional layer 20, while the portion embedded with the buffer layer 50 functions as the protective layer 40.

The internal electrode 30 is an electrical circuit element of the laminated ceramic electronic component and embedded in the functional layer 20. As shown in FIGS. 1 and 2, the internal electrode 30 has opposing electrodes 301, 302. For example, the internal electrode 30 may be a line constituting an inductor or a circuit pattern. The internal electrode 30 may be a multilayer structure as shown in FIGS. 1 and 2 or may be a single layer structure.

External electrodes 71, 72 are disposed at both ends of the ceramic substrate 10. The external electrode 71 is electrically connected to the electrodes 301, while the external electrode 72 is electrically connected to the electrodes 302.

The buffer layer 50 is embedded in the protective layer 40 to adjust burning shrinkage or thermal expansion coefficient.

The buffer layer 50 has a different burning shrinkage from the ceramic substrate 10. Preferably, the following relationship is satisfied:

$$|\alpha 1 - \alpha 2| < |\alpha 1 - \alpha 3|$$

wherein α1 represents the burning shrinkage of the functional layer 20, which is the resultant of the burning shrinkage of the internal electrode 30 and the burning shrinkage of the ceramic substrate surrounding the internal electrode 30, α2 represents the burning shrinkage of the protective layer 40, which is the resultant of the burning shrinkage of the buffer layer 50 and the burning shrinkage of the ceramic substrate surrounding the buffer layer 50, and α3 represents the burning shrinkage of the ceramic substrate constituting the protective layer 40.

The buffer layer 50 also has a different thermal expansion coefficient from the ceramic substrate 10. Preferably, the following relationship is satisfied:

$$|\beta 1 - \beta 2| < |\beta 1 - \beta 3|$$

wherein β1 represents the thermal expansion coefficient of the functional layer 20, which is the resultant of the thermal expansion coefficient of the internal electrode 30 and the thermal expansion coefficient of the ceramic substrate surrounding the internal electrode 30, β2 represents the thermal expansion coefficient of the protective layer 40, which is the resultant of the thermal expansion coefficient of the buffer layer 50 and the thermal expansion coefficient of the ceramic substrate surrounding the buffer layer 50, and β3 represents the thermal expansion coefficient of the ceramic substrate constituting the protective layer 40.

The burning shrinkage or thermal expansion coefficient of the buffer layer 50 may be set arbitrarily in accordance with the compositions, burning shrinkages or thermal expansion coefficients of the ceramic substrate 10 and the internal electrode 30. Preferably, the buffer layer 50 has the same composition, thermal behavior, burning shrinkage or thermal expansion coefficient as the internal electrode 30.

When adopted as a laminated ceramic capacitor, for example, it is preferred that the buffer layer 50 has a lower burning shrinkage or a higher thermal expansion coefficient than the ceramic substrate surrounding the buffer layer 50.

The buffer layer 50 may be conductive or nonconductive. As shown in FIG. 1, the buffer layer 50 is a dummy electrode which is not functioning as an electrical circuit element.

Figure 11:
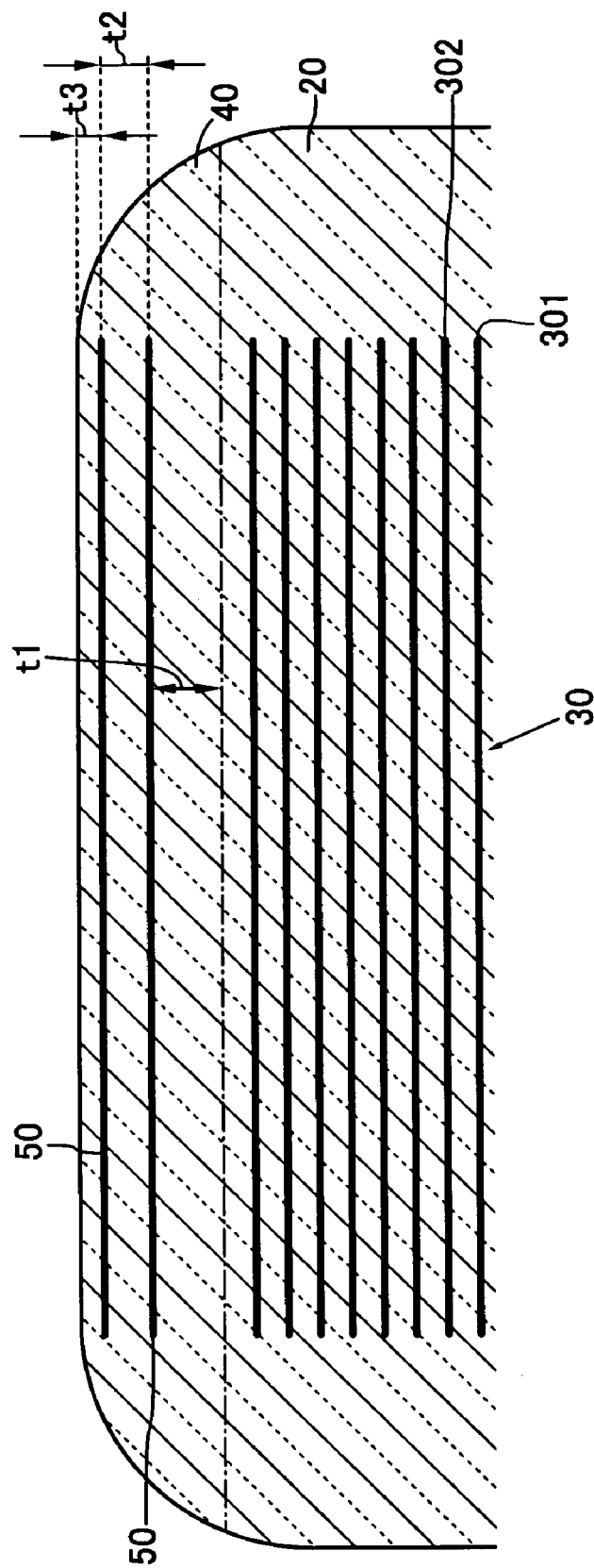
FIG. 11 is a sectional view of a laminated ceramic electronic component according to still another embodiment of the present invention.

The buffer layer 50 may be a single layer structure as shown in FIGS. 1 and 2 or may be a multilayer structure (see FIG. 11). The number, arrangement, thickness, shape, etc. of the buffer layers 50 may be determined arbitrarily. For example, the thickness of the buffer layer 50 may be uniform or ununiform. Also, the shape of the buffer layer 50 may be symmetrical or asymmetrical.

Preferably, the buffer layer 50 lies within the area where the internal electrode 30 is present as seen in the direction of lamination of the internal electrode 30, i.e., the buffer layer 50 has a smaller width than the internal electrode 30. Otherwise the buffer layer 50 may appear on the surface of the ceramic substrate 10 to have an electrical adverse effect.

For example, there is a possibility that the buffer layer 50 appears at both ends of the ceramic substrate 10 to cause short circuit failure such that one end of the buffer layer 50 is electrically connected to the external electrode 71 while the other end is electrically connected to the external electrode 72.

In FIG. 2, the protective layer 40 has thicknesses t1 and t2 for the lower and upper layers due to embedment of the buffer layer 50. The thicknesses t1 and t2 are preferably equal to or less than 100 μm.

In the above-described laminated ceramic electronic component, since the internal electrode 30 is embedded in the functional layer 20, the burning shrinkage of the functional layer 20 is the resultant of the burning shrinkage of the internal electrode 30 and the burning shrinkage of the ceramic substrate 10 surrounding the internal electrode 30.

On the other hand, since the buffer layer 50 is embedded in the protective layer 40, the burning shrinkage of the protective layer 40 is the resultant of the burning shrinkage of the buffer layer 50 and the burning shrinkage of the ceramic substrate 10 surrounding the buffer layer 50.

The buffer layer 50 has a different burning shrinkage from the ceramic substrate 10. For example, the burning shrinkage of the buffer layer 50 may be determined so that the burning shrinkage of the functional layer 20 approximately agrees with the burning shrinkage of the protective layer 40.

Making the burning shrinkage of the functional layer 20 approximately agree with the burning shrinkage of the protective layer 40 decreases stress along the interface between the functional layer 20 and the protective layer 40, inhibiting the occurrence of separation, delamination and cracks along the interface, which has been a problem in the prior art. This inhibits the occurrence of separation, delamination and cracks even when the electronic component is subjected to heat treatment (or annealing) or burning.

In the conventional case where no buffer layer is provided in the protective layer, on the other hand, since the functional layer embedded with the internal electrode and the protective layer not embedded with the buffer layer differ much in burning shrinkage, stress appearing along the interface between them tends to cause separation, delamination and cracks.

Figure 4:
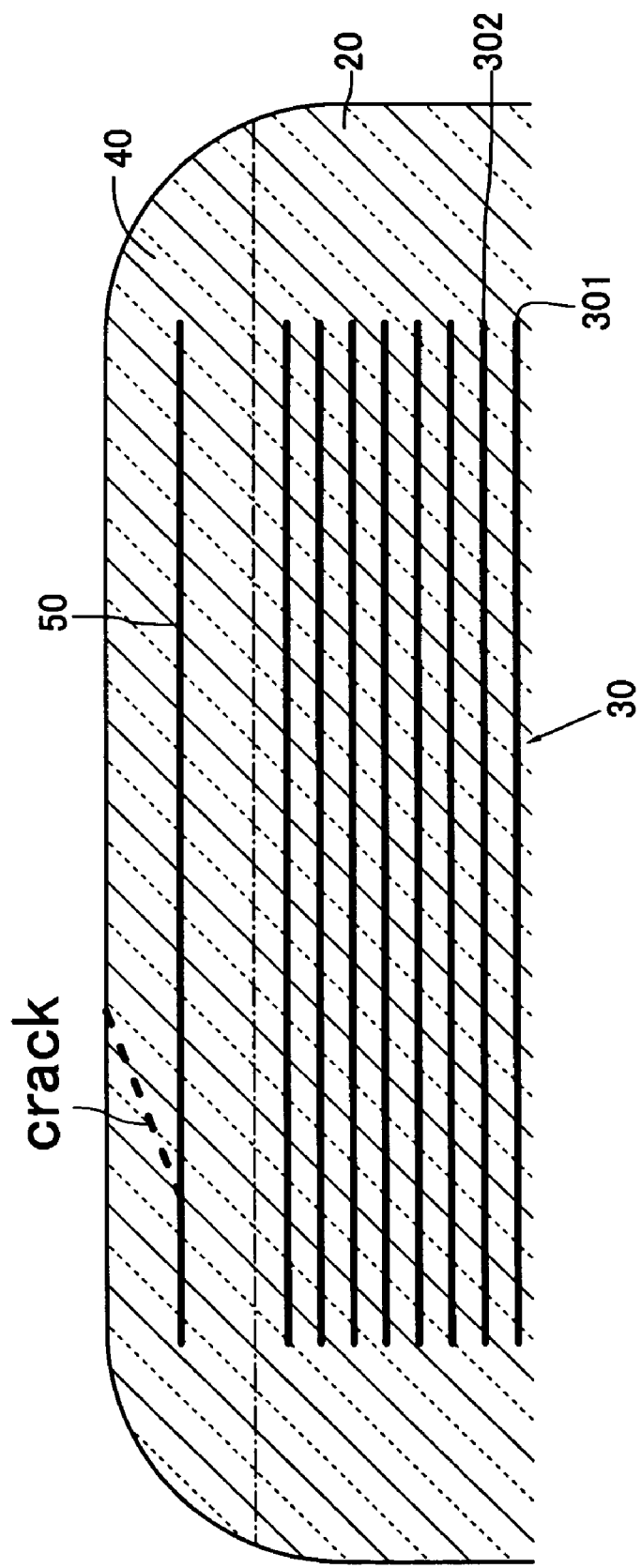
FIG. 4 is a sectional view showing a state where a crack occurs in a laminated ceramic electronic component according to one embodiment of the present invention.
Figure 5:
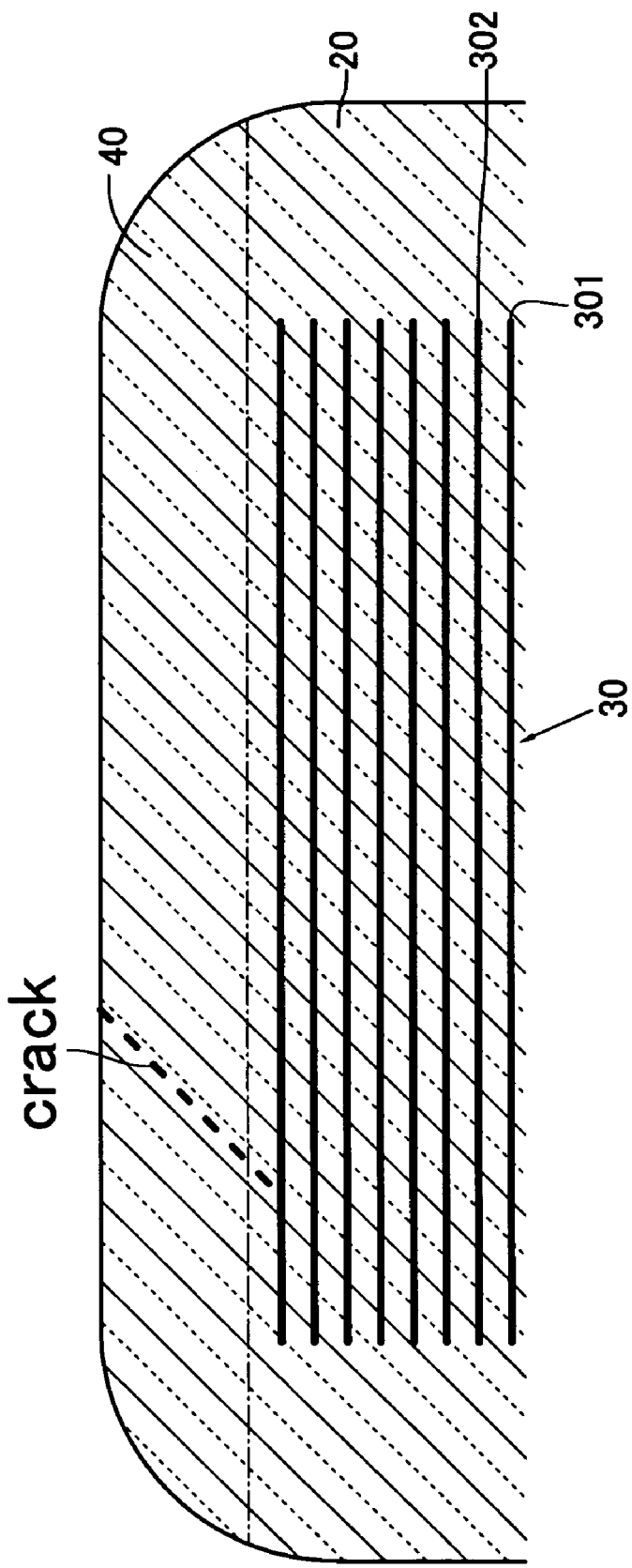
FIG. 5 is a sectional view showing a state where a crack occurs in a conventional laminated ceramic electronic component.

FIG. 4 is a sectional view showing a state where a crack occurs in the laminated ceramic electronic component of FIG. 2, and FIG. 5 is a sectional view showing a state where a crack occurs in a conventional laminated ceramic electronic component. The conventional electronic component differs from the laminated ceramic electronic component of FIG. 2 only in the absence of the buffer layer 50.

In the laminated ceramic electronic component of FIG. 2, the functional layer 20 is covered with the protective layer 40, and the buffer layer 50 is embedded in the protective layer 40. Referring to FIG. 4, therefore, if a crack occurs in the vicinity of the surface of the laminated ceramic electronic component, the crack is centered on the buffer layer 50 and prevented from reaching the internal electrode 30. Stopping the crack by the buffer layer 50 avoids the adverse effect on the internal electrode 30, resulting in excellent electrical characteristics. Moreover, production yield can be enhanced by preventing a defect that the internal electrode 30 is exposed (namely, cap off problem).

In FIG. 5, on the other hand, since the buffer layer 50 is not provided in the protective layer 40, the crack, which has occurred in the vicinity of the surface, reaches the internal electrode 30.

In the laminated ceramic electronic component of FIG. 2, furthermore, the buffer layer 50 embedded in the protective layer 40 divides the protective layer 40 into separate layers. This improves the conformability of the protective layer 40, preventing the occurrence of separation, delamination and cracks.

Figure 6:
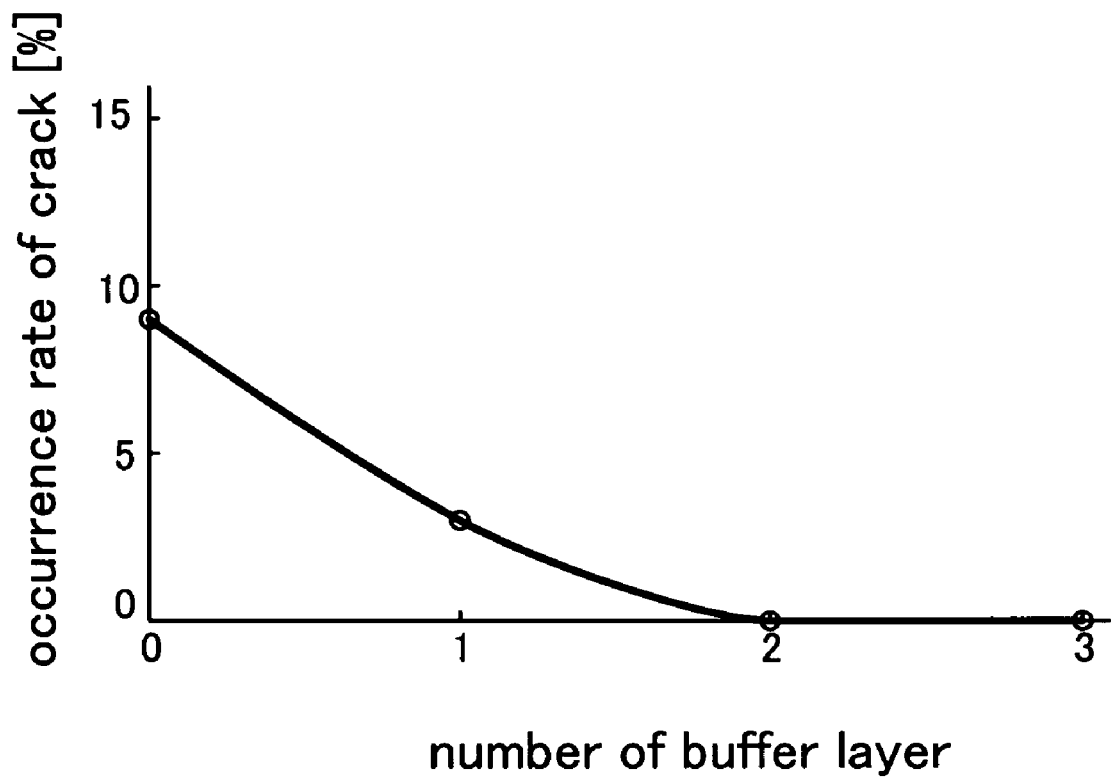
FIG. 6 is a diagram showing characteristics of a laminated ceramic electronic component.

FIG. 6 is a diagram showing a relationship between the number of buffer layers and the occurrence ratio of crack with respect to a laminated ceramic capacitor.

FIG. 6 shows the occurrence ratio of crack after wet barrel polishing with respect to a laminated ceramic capacitor whose dimensions are 3.2 mm×1.6 mm×1.6 mm. The internal electrodes in the functional layer were spaced a distance L1, while the buffer layer was spaced a distance L2 apart from the outermost internal electrode, wherein the distance L2 was 5 times as large as the distance L1. In the case where the number of buffer layers was two or more (see FIG. 11), the distance between adjacent buffer layers was equal to the distance L2. The buffer layer had a rectangular outline and a thickness of 5 μm.

Referring to FIG. 6, the occurrence ratio of crack decreased with increasing the number of buffer layers from 0. Particularly when the number of buffer layers was two or more, the occurrence ratio of crack was approximately zero, whereby extremely excellent characteristics could be obtained.

Moreover, since the illustrated laminated ceramic electronic component does not need a plurality of sheets with different binder contents, unlike JP 2003-309039, the manufacturing process becomes simple. For example, the illustrated laminated ceramic electronic component can easily be manufactured when the ceramic substrate constituting the functional layer 20 and the ceramic substrate constituting the protective layer 40 have the same material composition and the internal electrode 30 and the buffer layer 50 have the same material composition.

For example, the illustrated laminated ceramic electronic component may be manufactured by the following process. At first, a ceramic green sheet for the ceramic substrate 10 is formed by sheeting or printing method and a conductive paste is printed on the ceramic green sheet to form the internal electrode 30 or the buffer layer 50.

Then, the ceramic green sheets formed with the internal electrode 30 or the buffer layer 50 are laminated one on another to form a laminated structure, and the laminated structure is cut and subjected to binder removal treatment, burning, and heat treatment (or annealing). Subsequently, the laminated structure is subjected to (wet barrel) polishing and formed with the external electrodes to obtain the finished product shown in FIG. 1. It should be noted that the illustrated laminated ceramic electronic component may be manufactured by processes other than the above process.

Since the burning shrinkage of the protective layer 40 can easily be adjusted by the number, thickness and shape of the buffer layers 50, the illustrated laminated ceramic electronic component can easily be manufactured with a high yield.

According to another aspect of the present invention, the buffer layer has a different thermal expansion coefficient from the ceramic substrate with focusing on the thermal expansion coefficient of the buffer layer instead of the burning shrinkage of the buffer layer. Also in this case, the same effects and advantages can be obtained.

That is, as in the case of focusing on the burning shrinkage of the buffer layer, making the thermal expansion coefficient of the functional layer approximately agree with the thermal expansion coefficient of the protective layer decreases stress along the interface between the functional layer and the protective layer, inhibiting the occurrence of cracks and so on.

FIGS. 7 to 12 are explanatory drawings where the shape, the arrangement and the number of the buffer layers 50 vary in the laminated ceramic electronic component. In FIGS. 7 to 12, the portions corresponding to the components shown in FIGS. 1 to 6 are designated by the same reference numerals, and a duplicate description will be omitted. The following embodiments have the same effects and advantages as the foregoing embodiment due to the common components, and a duplicate description will be omitted.

Figure 7:
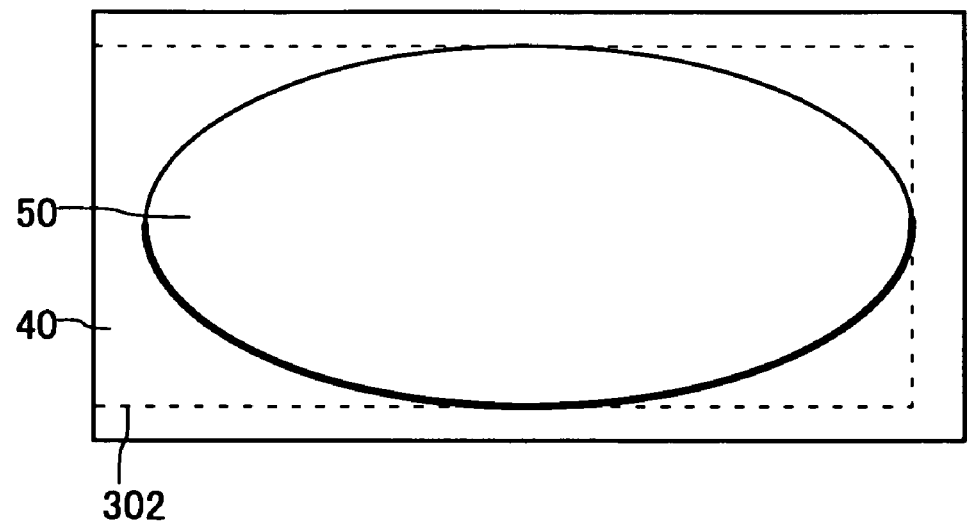
FIG. 7 is a sectional view of a laminated ceramic electronic component according to another embodiment of the present invention.
Figure 8:
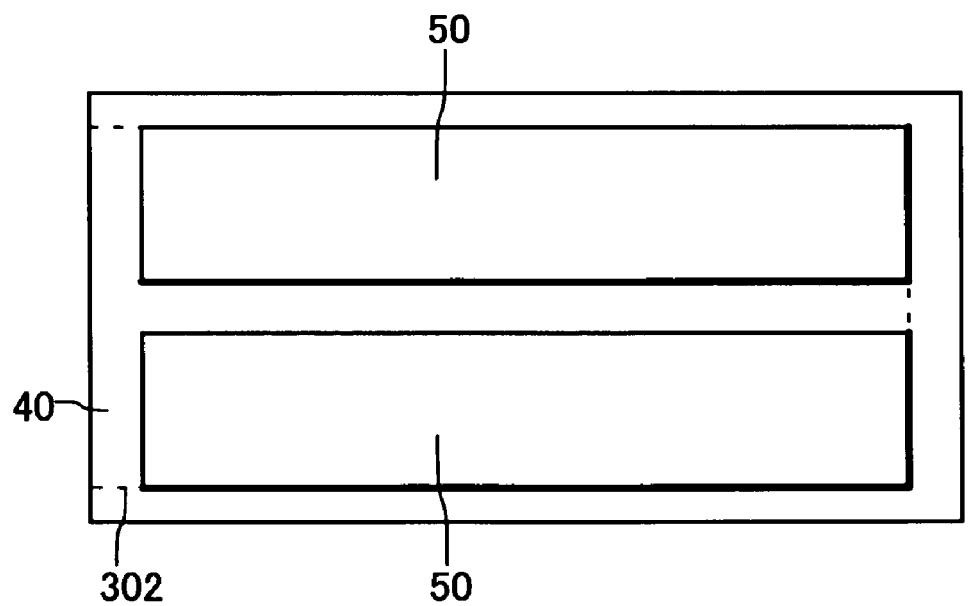
FIG. 8 is a sectional view of a laminated ceramic electronic component according to still another embodiment of the present invention.
Figure 9:
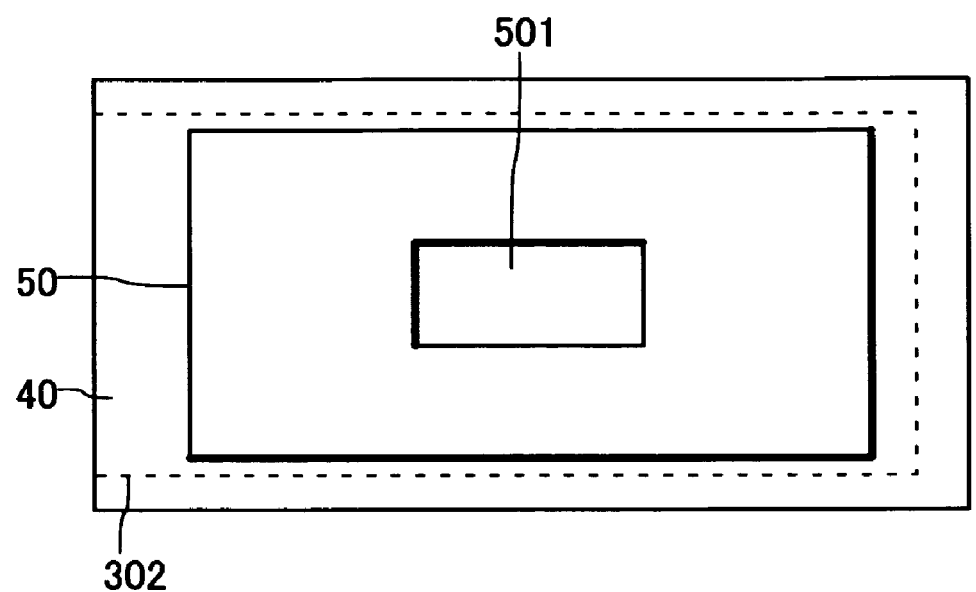
FIG. 9 is a sectional view of a laminated ceramic electronic component according to still another embodiment of the present invention.
Figure 10:
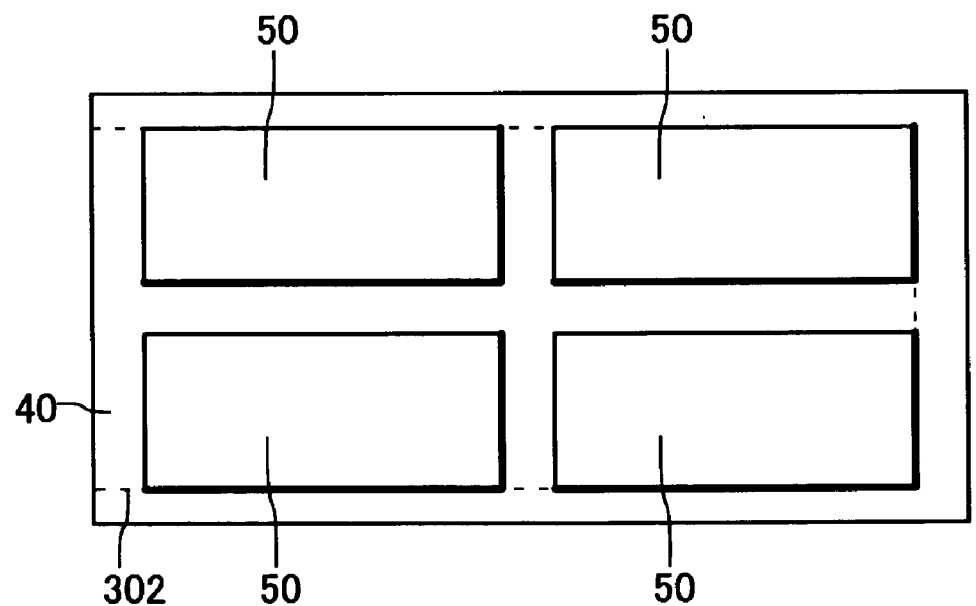
FIG. 10 is a sectional view of a laminated ceramic electronic component according to still another embodiment of the present invention.

FIGS. 7 to 10 are sectional views corresponding to FIG. 3. In FIG. 7, the buffer layer 50 has an oval outline. In FIG. 8, the buffer layer 50 is separated into two rectangles. In FIG. 9, the buffer layer 50 is generally ring-shaped with a cut-out 501 centrally thereof. In FIG. 10, the buffer layer 50 is separated into four rectangles.

Figure 12:
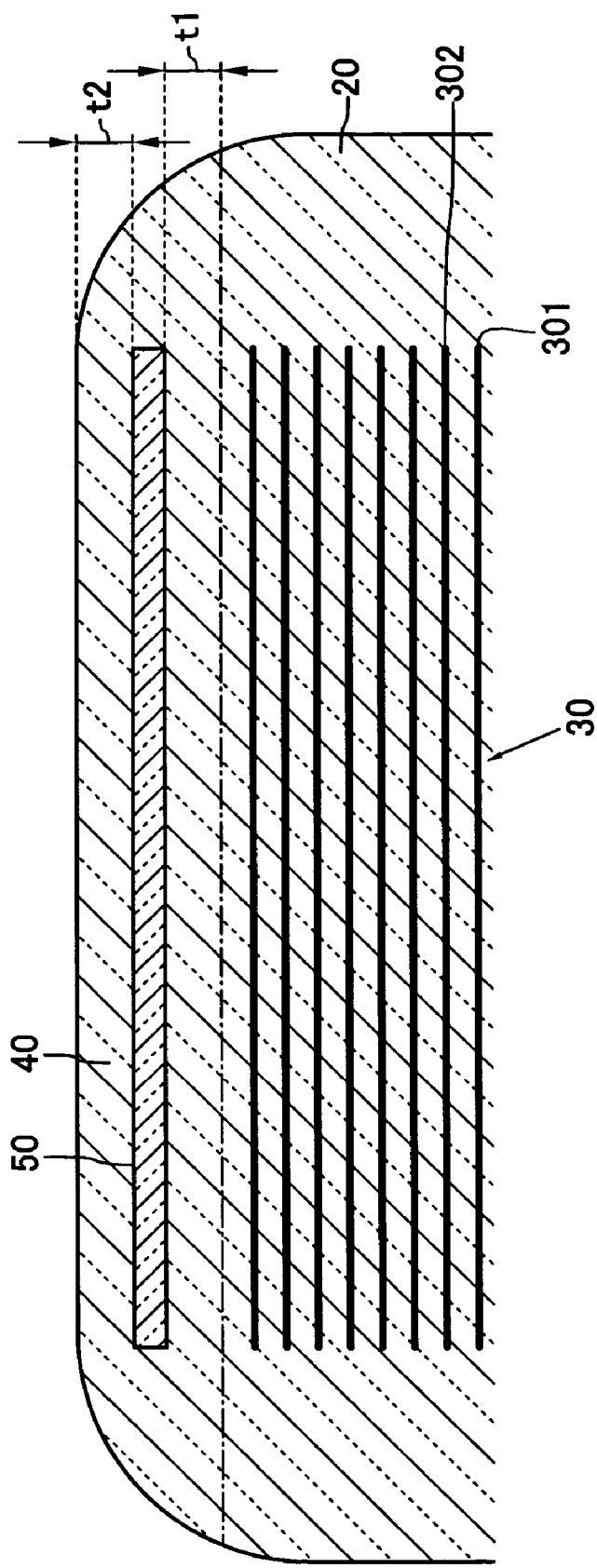
FIG. 12 is a sectional view of a laminated ceramic electronic component according to still another embodiment of the present invention.

FIGS. 11 and 12 are sectional views corresponding to FIG. 2. In FIG. 11, two buffer layers 50 are provided so that the protective layer 40 has thicknesses t1, t2, and t3 for the lower, intermediate, and upper layers, respectively. In FIG. 12, the buffer layer 50 is a dielectric layer.

While the present invention has been particularly shown and described with reference to embodiments thereof, it will be understood by those skilled in the art that various changes in form and detail may be made therein without departing from the spirit, scope and teaching of the invention.

What is claimed is:

1. A laminated ceramic electronic component comprising:
a ceramic substrate;
an internal electrode; and
a buffer layer,
wherein said ceramic substrate includes a protective layer and a functional layer,
said protective layer is disposed on at least one side of said functional layer, said internal electrode is embedded in said functional layer, and
said buffer layer is embedded in said protective layer and has a different burning shrinkage from said ceramic substrate,
wherein $$|\alpha 1 - \alpha 2| < |\alpha 1 - \alpha 3|$$

where $\alpha 1$ represents a burning shrinkage of said functional layer, which is a resultant of a burning shrinkage of said internal electrode and a burning shrinkage of said ceramic substrate surrounding said internal electrode, $\alpha 2$ represents a burning shrinkage of said protective layer, which is a resultant of a burning shrinkage of said buffer layer and a burning shrinkage of said ceramic substrate surrounding said buffer layer, and $\alpha 3$ represents a burning shrinkage of said ceramic substrate constituting said protective layer.

2. The laminated ceramic electronic component of claim 1, wherein said buffer layer has a lower burning shrinkage than said ceramic substrate surrounding said buffer layer.

3. The laminated ceramic electronic component of claim 1, wherein said buffer layer has substantially the same composition as said internal electrode.

4. The laminated ceramic electronic component of claim 1, wherein said buffer layer is a dummy electrode which is electrically insulated from said internal electrode.

5. The laminated ceramic electronic component of claim 1, wherein said buffer layer has a smaller width than said internal electrode and lies with in the area where said internal electrode is present from a perspective in the direction of lamination of said internal electrode.

6. A laminated ceramic electronic component comprising:
a ceramic substrate;
an internal electrode; and
a buffer layer,
wherein said ceramic substrate includes a protective layer and a functional layer,
said protective layer is disposed on at least one side of said functional layer,
said internal electrode is embedded in said functional layer, and
said buffer layer is embedded in said protective layer and has a different thermal expansion coefficient from said ceramic substrate
wherein $$|\beta 1 - \beta 2| < |\beta 1 - \beta 3|$$

where $\beta 1$ represents a thermal expansion coefficient of said functional layer, which is a resultant of a thermal expansion coefficient of said internal electrode and a thermal expansion coefficient of said ceramic substrate surrounding said internal electrode, $\beta 2$ represents a thermal expansion coefficient of said protective layer, which is a resultant of a thermal expansion coefficient of said buffer layer and a thermal expansion coefficient of said ceramic substrate surrounding said buffer layer, and $\beta 3$ represents a thermal expansion coefficient of said ceramic substrate constituting said protective layer.

7. The laminated ceramic electronic component of claim 6, wherein said buffer layer has a higher thermal expansion coefficient than said ceramic substrate surrounding said buffer layer.

8. The laminated ceramic electronic component of claim 6, wherein said buffer layer has substantially the same composition as said internal electrode.

9. The laminated ceramic electronic component of claim 6, wherein said buffer layer is a dummy electrode which is electrically insulated from said internal electrode.

10. A laminated ceramic electronic component comprising:
a ceramic substrate;
an internal electrode; and
a buffer layer,
wherein said ceramic substrate includes a protective layer and a functional layer,
said protective layer is disposed on at least one side of said functional layer,
and internal electrode is embedded in said functional layer, and said buffer layer comprises a dielectric layer, is embedded in said protective layer, has a different burning shrinkage from said ceramic substrate, and has an oval outline.

11. A laminated ceramic electronic component comprising:
   a ceramic substrate;
   an internal electrode; and
   a buffer layer,
   wherein said ceramic substrate includes a protective layer and a functional layer,
   said protective layer is disposed on at least one side of said functional layer,
   said internal electrode is embedded in said functional layer, and
   said buffer layer is embedded in said protective layer, has a different burning shrinkage from said ceramic substrate, and is separated into two rectangles.

12. A laminated ceramic electronic component comprising:
   a ceramic substrate;
   an internal electrode; and
   a buffer layer,
   wherein said ceramic substrate includes a protective layer and a functional layer,
   said protective layer is disposed on at least one side of said functional layer,
   said internal electrode is embedded in said functional layer, and
   said buffer layer is embedded in said protective layer, has a different burning shrinkage from said ceramic substrate, and is ring-shaped with a cut-out centrally thereof.

13. A laminated ceramic electronic component comprising:
   a ceramic substrate;
   an internal electrode; and
   a buffer layer,
   wherein said ceramic substrate includes a protective layer and a functional layer,
   said protective layer is disposed on at least one side of said functional layer,
   said internal electrode is embedded in said functional layer, and
   said buffer layer is embedded in said protective layer, has a different burning shrinkage from said ceramic substrate, and is separated into four rectangles.

14. A laminated ceramic electronic component comprising:
   a ceramic substrate;
   an internal electrode; and
   a buffer layer,
   wherein said ceramic substrate includes a protective layer and a functional layer,
   said protective layer is disposed on at least one side of said functional layer,
   and internal electrode is embedded in said functional layer, and
   said buffer layer is embedded in said protective layer, has a different burning shrinkage from said ceramic substrate, and comprises a dielectric layer.

* * * * *